(12) United States Patent
Suzuki (10) Patent No.: US 8,811,169 B2
(45) Date of Patent: Aug. 19, 2014

(54) COMMUNICATION DEVICE AND COMMUNICATION CONTROL METHOD

(75) Inventor: Yasutomo Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 128 days.

(21) Appl. No.: 13/511,255

(22) PCT Filed: Dec. 13, 2010

(86) PCT No.: PCT/JP2010/072819
§ 371 (c)(1),
(2), (4) Date: May 22, 2012

(87) PCT Pub. No.: WO2011/074681
PCT Pub. Date: Jun. 23, 2011

(65) Prior Publication Data
US 2012/0230190 A1    Sep. 13, 2012

(30) Foreign Application Priority Data

Dec. 14, 2009 (JP) .................................. 2009-282562

(51) Int. Cl.
*H04W 28/12* (2009.01)
*H04L 12/26* (2006.01)
*H04L 1/00* (2006.01)

(52) U.S. Cl.
CPC .................................. *H04L 1/0003* (2013.01)
USPC ............................. 370/230; 370/236; 370/412

(58) Field of Classification Search
None
See application file for complete search history.

(56) References Cited

U.S. PATENT DOCUMENTS 6,590,899 B1 * 7/2003 Thomas et al. ............... 370/422

| 2003/0003905 A1 * | 1/2003 | Shvodian ....................... 455/423 |
| 2004/0165596 A1 * | 8/2004 | Garcia et al. ............. 370/395.21 |
| 2005/0213674 A1 * | 9/2005 | Kobayashi ..................... 375/259 |
| 2007/0153921 A1 * | 7/2007 | Nakabayashi ................. 375/259 |
| 2007/0223505 A1 * | 9/2007 | Itai et al. ........................ 370/412 |
| 2008/0016173 A1 * | 1/2008 | Schiavone et al. ............ 709/207 |

FOREIGN PATENT DOCUMENTS

| JP | 2000-261398 | 9/2000 |
| JP | 2005-086479 | 3/2005 |
| JP | 2005-184662 | 7/2005 |
| JP | 2006-086626 | 3/2006 |
| JP | 2006-173711 | 6/2006 |
| JP | 2006-217663 | 8/2006 |
| JP | 2007-258865 | 10/2007 |

OTHER PUBLICATIONS

International Search Report, PCT/JP2010/072819, Mar. 15, 2011.

* cited by examiner

*Primary Examiner* — Hassan Kizou
*Assistant Examiner* — Tejis Daya
(74) *Attorney, Agent, or Firm* — Young & Thompson (57) ABSTRACT

Device for controlling a transmission rate of information includes a reception element receiving an input signal, and outputting received data; a transmission element accepting a transmission frame, transmitting a transmission signal at a first transmission rate set based on transmission control information, and outputting a transmission timing signal indicating completion timing of transmission of the transmission signal; an information extracting element extracting the transmission control information from the received data, and designating a second transmission rate when transmitting the next transmission frame to the transmission element; and a service quality control element changing, upon detecting a second transmission rate smaller than the first transmission rate, an upper limit transmission rate to the second transmission rate or less, changing, upon detecting a second transmission rate larger than the first transmission rate, the upper limit transmission rate to the second transmission rate or less after the completion timing, and generating the transmission frame from transmitted data based on the upper limit transmission rate.

14 Claims, 6 Drawing Sheets

COMMUNICATION DEVICE AND COMMUNICATION CONTROL METHOD

TECHNICAL FIELD

The present invention relates to a communication device and a communication control method, and, more particularly, to a communication device and a communication control method which perform service quality control based on a change in a transmission rate.

BACKGROUND ART

In a wireless communication device, there is a case where an "adaptive modulation method" which changes a modulation method according to a situation of a radio transmission channel is adopted. In an adaptive modulation method, when a situation of a radio transmission channel is good, a modulation method having a relatively high-speed transmission rate is applied, and when a situation of the radio transmission channel is not good, a modulation method having a relatively low-speed transmission rate is applied, for example. It is possible to change a transmission rate by a multi-value number that is the number of stages for performing modulation and a modulation rate.

In a radio communication system adopting an adaptive modulation method to a wireless communication section, a transmission rate of the wireless communication section varies according to a situation of a radio transmission channel. Because a transmission rate of a wireless communication section corresponds to capacity of information transmission, hereinafter, it is called a bandwidth (transmission capacity).

Meanwhile, in order to deliver time-critical data such as sound and animation to a destination device within a given time on an IP (Internet Protocol) network, a predetermined communication quality is required for the network. In such network, transmission data may be classified into each of its traffic types and the data may be controlled to be forwarded based on priority. Such control is called as service quality (Quality of Service: henceforth, referred to as "QoS") control. In a communication system in which QoS control is performed, control for guaranteeing a predetermined transmission rate required for transmitting information (henceforth, referred to as "information transmission rate") is performed. Accordingly, when a bandwidth changes, it is necessary to perform QoS control corresponding to the change. That is, a network environment in which an information transmission rate can be guaranteed even if a bandwidth changes is required.

It is conceivable to apply QoS control used for a wired LAN (Local Area Network) to a radio communication system adopting an adaptive modulation method for a wireless communication section just as it is. In this case, when a bandwidth of a wireless communication section is larger than an information transmission rate, a waiting time until a certain frame is transmitted (henceforth, referred to as a "transmission waiting time") does not occur. However, when an information transmission rate exceeds a bandwidth of a wireless communication section, there is a possibility that a transmission waiting time occurs, and that so-called "frame loss (packet loss)" that is a case where a frame is discarded without being transmitted occurs.

A technology which performs QoS control in a radio communication system adopting an adaptive modulation method is disclosed in patent document 1, for example. In the technology of patent document 1, presence or absence of QoS control is switched based on a wireless transmission rate. That is, when a wireless transmission rate switches from a high speed to a low speed by a change of a modulation method, QoS control becomes valid. Then, by delaying switching timing of a modulation method, decline of data transfer efficiency by an insufficient wireless transmission rate is suppressed. On the other hand, when a wireless transmission rate switches from a low speed to a high speed by a change in a modulation method, QoS control is canceled.

In an adaptive modulation method, there is also a technology which performs QoS control according to a change in a transmission rate (for example, refer to patent document 2). In the technology of patent document 2, subjects which are operated in order to perform QoS control are a coding rate, a modulation method and a multiplexing scheme or the like.

In an adaptive modulation method, there is also a technology which sets parameters of a modulation method and an equalizer according to priority control by QoS (for example, refer to patent document 3). In the technology of patent document 3, when a high transmission rate is needed, a parameter for a high rate is set, and, when a high rate is not required, a parameter for a low rate is set, for example.

PRIOR ART DOCUMENT

Patent Document

[Patent document 1] Japanese Patent Application Laid-Open No. 2006-86626 (page 7, FIG. 1 and FIG. 3)
[Patent document 2] Japanese Patent Application Laid-Open No. 2005-86479 (pages 4-5, FIG. 1)
[Patent document 3] Japanese Patent Application Laid-Open No. 2006-173711 (pages 7-9, FIG. 1)

SUMMARY OF INVENTION

Technical Problem

In the technology of patent document 1, the following problems exist. The first problem is that, when QoS control is made valid, a situational change of a radio transmission channel cannot be followed because change timing of a modulation method delays. When a situational change of a radio transmission channel cannot be followed, there is a possibility that deterioration of a line quality and disconnection of a line of a wireless communication section is caused, resulting in occurrence of a packet loss. The second problem is that, when QoS control is cancelled, there is no consideration for increase in traffic of input data. If QoS control is being cancelled when traffic is increased, a frame loss of a frame with high priority may occur. The third problem is that, because presence or absence of QoS control is switched by a selected modulation method, variation of a delay time may occur as a result. The reason of this is that, generally, the delay time increases during QoS control.

In the technologies of patent documents 2 and 3, controlled subjects for performing QoS control are a coding rate, a modulation method, a multiplexing scheme, parameters of an equalizer and the like, and an information transmission rate of information which should be transmitted is not controlled. Accordingly, when information which should be transmitted increases, there is a problem that high service quality cannot be guaranteed necessarily about all the information.

In order to perform QoS control not only in a communication system adopting an adaptive modulation method but also, in general, in a system in which a bandwidth of a communication section changes, it is desired to change an information transmission rate by making it correspond to a change in a bandwidth appropriately.

Object of the Invention

The present invention is made in view of the above-mentioned technical problems, and its object is to provide a communication device and a communication control method which can control a transmission rate of information such that it does not exceed a bandwidth.

Solution to Problem

A communication device of the present invention includes: a reception means for receiving an input signal, and outputting received data; a transmission means for accepting a transmission frame, transmitting a transmission signal at a first transmission rate set based on transmission control information, and outputting a transmission timing signal indicating completion timing of transmission of the transmission signal; an information extracting means for extracting the transmission control information from the received data, and designating a second transmission rate when transmitting the next transmission frame to the transmission means; and a service quality control means for changing, upon detecting a second transmission rate being smaller than the first transmission rate, an upper limit transmission rate to the second transmission rate or less, changing, upon detecting a second transmission rate being larger than the first transmission rate, the upper limit transmission rate to the second transmission rate or less after the completion timing, and generating the transmission frame from transmitted data based on the upper limit transmission rate.

A communication control method of the present invention: receives an input signal, and outputs received data; accepts a transmission frame, transmits a transmission signal at a first transmission rate set based on transmission control information, and outputs a transmission timing signal indicating completion timing of transmission of the transmission signal; extracts the transmission control information from the received data, and designates a second transmission rate when transmitting the next transmission frame to the transmission means; and changes, upon detecting a second transmission rate being smaller than the first transmission rate, an upper limit transmission rate to the second transmission rate or less, changes, upon detecting a second transmission rate being larger than the first transmission rate, the upper limit transmission rate to the second transmission rate or less after the completion timing, and generates the transmission frame from transmitted data based on the upper limit transmission rate.

Advantageous Effects of Invention

A communication device and a communication control method of the present invention control a transmission rate of information such that it never exceed a bandwidth. Accordingly, it has the effect that occurrence of a transmission waiting time of information and occurrence of a packet loss and the like can be prevented.

DESCRIPTION OF PREFERRED EMBODIMENTS (The First Exemplary Embodiment)

Figure 1:
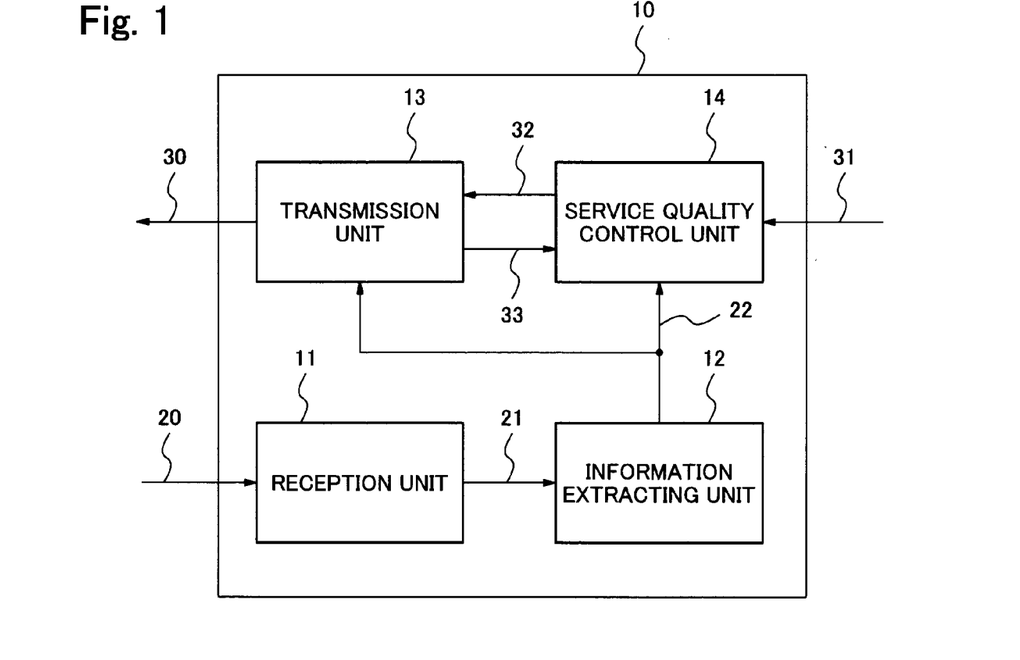
FIG. 1 is a block diagram showing a structure of a communication device of a first exemplary embodiment of the present invention.

Next, embodiments of the present invention will be described in detail with reference to drawings. FIG. 1 is a block diagram showing a structure of a communication device of the first exemplary embodiment of the present invention.

A communication device of this exemplary embodiment includes a reception unit 11, an information extracting unit 12, a transmission unit 13 and a service quality control unit 14.

The reception unit 11 receives an input signal 20 and outputs received data 21.

The information extracting unit 12 extracts transmission control information 22 from the received data 21. The transmission control information 22 designates a transmission rate when the transmission unit 13 transmits a transmission signal 30. If the transmission unit 13 performs modulation, the transmission control information 22 may designate a method of modulation. Specifically, the transmission control information 22 may designate a target of modulation (amplitude, a frequency or a phase), a multi-value number that is the number of stages of modulation, a modulation rate and the like. Even in a case where the transmission control information 22 designates a method of modulation, a transmission rate when the transmission unit 13 transmits the transmission signal 30 can be determined based on the transmission control information 22.

The transmission unit 13 accepts a transmission frame 32, and transmits the transmission signal 30 at a first transmission rate set based on the transmission control information 22. The transmission unit 13 outputs transmission timing signal 33 which indicates completion timing of transmission of a transmission signal. Because the first transmission rate can be set for each transmission frame 32, every time the transmission timing signal 33 is outputted, the first transmission rate when transmitting the next transmission signal 30 can be changed. The transmission control information 22 as the transmission signal 30 is being transmitted designates a transmission rate when transmitting the next transmission signal 30 (henceforth, referred to as "a second transmission rate"), not the transmission rate at that time, that is, the first transmission rate. In other words, the first transmission rate, that is, the transmission rate of the transmission signal 30 that is being transmitted is designated by the last transmission control information 22, and the second transmission rate, that is, a transmission rate of the transmission signal 30 to be transmitted next is designated by the present transmission control information 22.

The service quality control unit 14 performs control of the service quality (QoS control). Specifically, QoS control means outputting the transmission frame 32 from transmitted data 31 based on an upper limit rate that has been set. For example, the service quality control unit 14 should just generate the transmission frame 32 from the transmitted data 31 so that a transmission rate needed for transmission may not exceed the upper limit transmission rate. At that time, the service quality control unit 14 detects that the first transmission rate changes, in other words, the first transmission rate and the second transmission rate are different from each other, and performs the following control to the upper limit transmission rate. Meanwhile, because a transmission rate of the transmission signal 30 is designated by the transmission control information 22, the service quality control unit 14 can detect that a transmission rate changes by observing a change in the transmission control information 22.

When detecting that the second transmission rate is smaller than the first transmission rate, the service quality control unit 14 changes the upper limit transmission rate to the second transmission rate. In other words, when detecting that a transmission rate of the transmission signal 30 is reduced, the service quality control unit 14 changes the upper limit transmission rate to the transmission rate after the reduction. The reason to perform such control is to prevent a transmission waiting time and a frame loss from happening by reducing a transmission rate of the transmission frame 32 before the transmission rate of the transmission signal 30 is reduced.

When detecting that the second transmission rate is larger than the first transmission rate, the service quality control unit 14 changes the upper limit transmission rate to the next transmission rate at timing when the transmission rate of the transmission signal 30 is changed in the transmission unit 13. In other words, when detecting that a transmission rate of the transmission signal 30 is raised, the service quality control unit 14 waits for output of the transmission timing signal 33 to change the upper limit transmission rate to the transmission rate after the raise. A reason to perform such control is to prevent transmission waiting and a packet loss from occurring by making a transmission rate of the transmission frame 32 rise after the transmission rate of the transmission signal 30 has been raised.

Meanwhile, when the first transmission rate and the second transmission rate are equal, that is, a transmission rate of the transmission signal 30 does not change, the upper limit transmission rate is not changed.

By performing control by the service quality control unit 14, a transmission rate of the transmission frame 32 (information transmission rate) will be always a transmission rate that is applicable when the transmission unit 13 transmits the transmission signal 30, that is, equal to or less than a bandwidth.

Various methods can be adopted as a specific control method at the time when the service quality control unit 14 performs QoS control.

For example, the service quality control unit 14 accepts the transmission control information 22 from the information extracting unit 12, and determines the second transmission rate. The service quality control unit 14 holds the transmission control information 22 in its interior. As a result, when the transmission control information 22 is accepted newly, a change in and increase/decrease of the second transmission rate is detected. Also, the service quality control unit 14 receives the transmission timing signal 33 from the transmission unit 13. Then, when the second transmission rate has been reduced, the service quality control unit 14 changes the upper limit transmission rate to the second transmission rate immediately. When the second transmission rate has been raised, the upper limit transmission rate is changed to the second transmission rate at timing when the transmission timing signal 33 is outputted.

Figure 2:
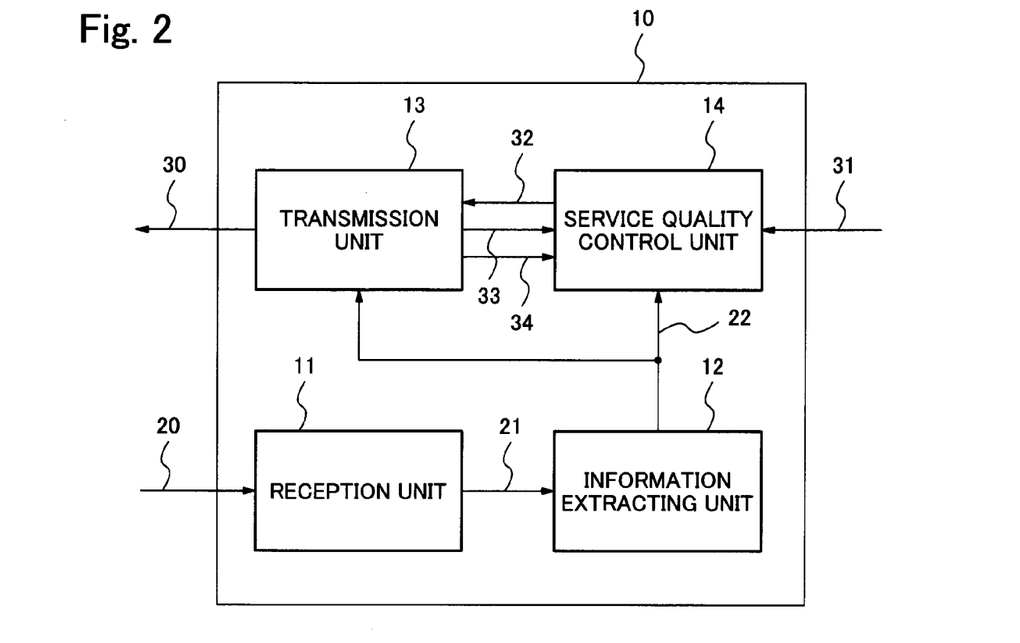
FIG. 2 is a block diagram showing a first modification of a structure of a communication device of the first exemplary embodiment of the present invention.

FIG. 2 is a block diagram showing the first modification of a structure of a communication device of the first exemplary embodiment. The service quality control unit 14 accepts the transmission control information 22 from the information extracting unit 12, and determines the second transmission rate. The service quality control unit 14 receives from the transmission unit 13 the transmission timing signal 33 that indicates completion timing of transmission of the present transmission signal 30 and transmission rate information 34 which indicates the first transmission rate. Then, the service quality control unit 14 determines a change between the first transmission rate and the second transmission rate. When the second transmission rate is smaller than the first transmission rate, the upper limit transmission rate is changed to the second transmission rate immediately. When the second transmission rate is larger than the first transmission rate, the upper limit transmission rate is changed to the second transmission rate at timing when the transmission timing signal 33 is outputted.

As mentioned above, when a change in a transmission rate of the transmission signal 30 is detected, the upper limit transmission rate used for QoS control is changed by the service quality control unit 14. Then, the transmission frame 32 is generated so that the upper limit transmission rate may not be exceeded.

Meanwhile, specific operations of QoS control by the service quality control unit 14 are not limited in particular.

Methods of QoS control are roughly classified into "priority control" and "band limitation". Priority control is a control to select and transmit frames in order of priority from highest to lowest within a usable band, that is, a range equal to or less than the upper limit transmission rate. Such processing is also called "packet scheduling (Packet Scheduling)". In this exemplary embodiment, an example of specific processing when performing scheduling as QoS control will be described below.

First, the transmitted data 31 includes a plurality of frames, and, to the respective frames, priority that designates order of transmission on a priority basis is set. The service quality control unit 14 selects the transmission frame 32 from the plurality of frames based on the upper limit transmission rate and priority.

To each of the plurality of frames, a predetermined transmission rate required to transmit it (information transmission rate) may be set. At that time, the service quality control unit 14 selects the transmission frame 32 from the plurality of frames based on priority so that the amount of each information transmission rate of selected pieces of transmission frame 32 will be equal to or less than the upper limit transmission rate. For example, frames are selected starting from a frame with the highest priority, and when the upper limit transmission rate is not exceeded, a frame with the next highest priority is selected. Frames are selected in order of priority within a range where the total of the information transmission rates of the selected frames does not exceed the upper limit transmission rate.

Band limitation is a processing for, when frames to be transmitted in order of priority have been selected, avoiding transmission of a frame, transmission of which is impossible under such not-exceeding-the-upper-limit-transmission-rate condition because its priority is low. This processing is also called "shaping (Shaping)". Shaping includes a method to discard a frame which is impossible to be transmitted under such not-exceeding-the-upper-limit-transmission-rate condition, for example. Alternately, there is also a method: to request a source inputting a frame to be transmitted to a communication device to reduce a transmission amount of frames; or to notify the source of refusal of frame reception. This method is a kind of so-called "flow control". In this exemplary embodiment, an example of specific processing when performing Shaping as QoS control will be described below.

First, the transmitted data 31 includes a plurality of frames, and, to the respective frames, priority that designates order of transmission on a priority basis is set. The service quality control unit 14 discards certain frames among the plurality of frames based on an upper limit transmission rate and priority, and selects frames which have not been discarded as transmission frames.

To the plurality of frames, information transmission rates required in order to transmit the frames may be set. At that time, the service quality control unit 14 should just discard certain frames based on priority so that the amount of the respective information transmission rates of selected transmission frames may not exceed the upper limit transmission rate. Or, the service quality control unit 14 may perform flow control between itself and the sources of certain frames among a plurality of frames based on the upper limit transmission rate and priority, and select frames from sources except for the sources of the certain frames as a transmission frame.

Incidentally, when the transmission unit 13 performs predetermined modulation to transmit the transmission signal 30, a change in a transmission rate can be detected using parameters of a modulation method. A theoretical transmission rate of a certain modulation method is equal to a product of a square root of a multi-value number and a modulation rate (a symbol rate, a baud rate). Accordingly, a change in a transmission rate can be detected based on a change in a multi-value number, which is the number of stages of modulation, and a change in a modulation rate between the modulation method being applied to the transmission signal 30 being transmitted and a modulation method to be applied to the next transmission signal 30.

Figure 3:
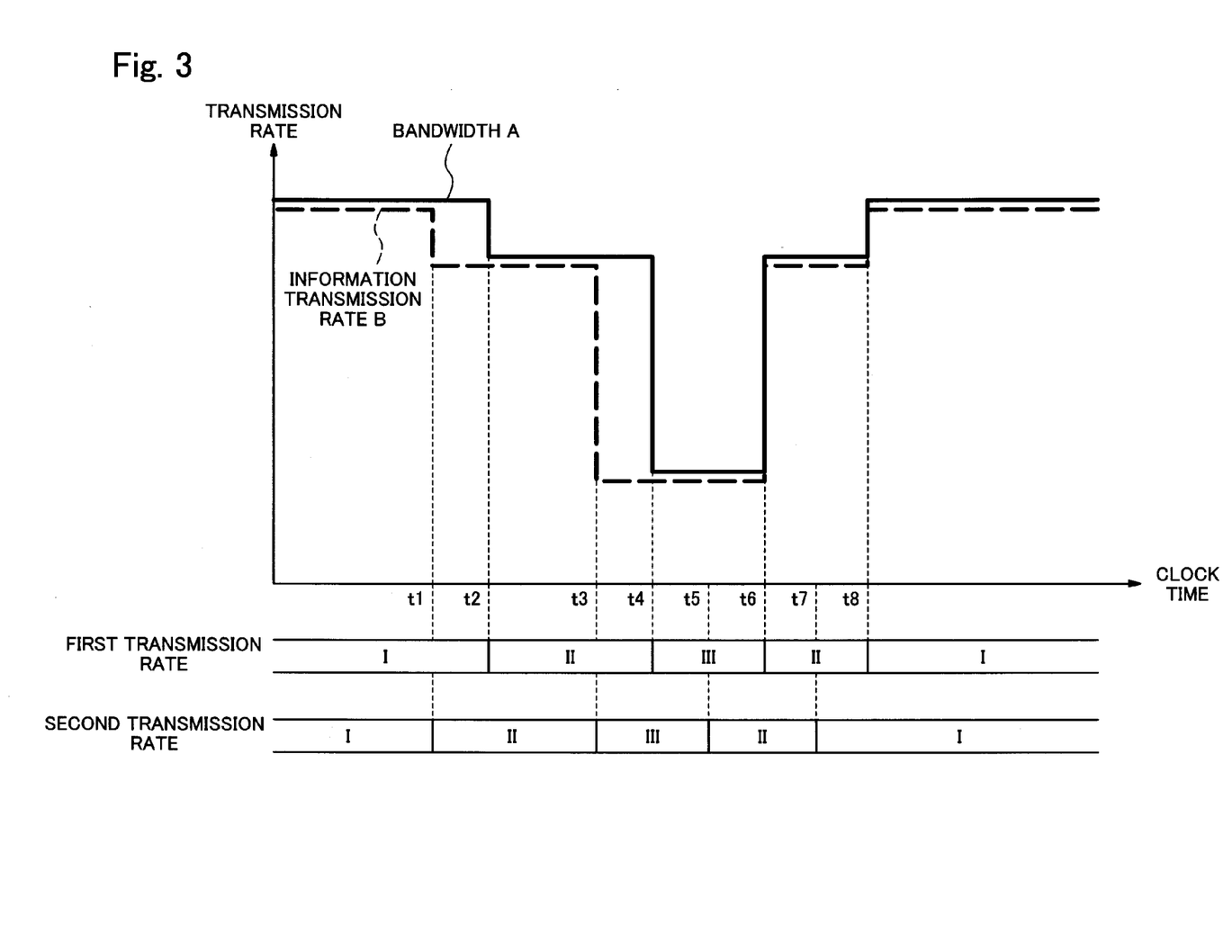
FIG. 3 is a graph showing an operation of a communication device of the first exemplary embodiment of the present invention.

A specific example of an operation of this exemplary embodiment will be described using the graph of FIG. 3. FIG. 3 is a graph showing an example of an operation of this exemplary embodiment, and the vertical axis shows a transmission rate and the horizontal axis is clock time. Regarding each line of the graph, a solid line A indicates a bandwidth and a dashed line B indicates an upper limit transmission rate for performing QoS control. Transitions of the first transmission rate that is a transmission rate applied to the transmission signal 30 being transmitted at present and of the second transmission rate that is a transmission rate applied to the next transmission signal 30 are indicated in the lower parts of the graph. It is supposed that a transmission rate can be set to any one of three kinds, I, II and III, and the highest is I, followed by II, III in this order.

At time t1, the service quality control unit 14 detects that a transmission rate changes from I to II based on the transmission control information 22. In this case, it is meant that a transmission rate is reduced. However, a transmission rate which the transmission control information 22 indicates is a transmission rate applied to the next transmission signal 30, and it is after completion of transmission of the transmission signal 30 being transmitted at present that a transmission rate changes actually.

At that time, the service quality control unit 14 changes the upper limit transmission rate to the second transmission rate immediately. That is, the upper limit transmission rate is reduced before the timing when a transmission rate applied to the transmission signal 30 declines (time t2).

It is also similar for time t3. That is, the service quality control unit 14 detects at t3 that the second transmission rate is reduced to III from II, and changes the upper limit transmission rate to the second transmission rate at time t4.

At time t5, the service quality control unit 14 detects that the second transmission rate becomes larger than the first transmission rate. At that time, the upper limit transmission rate is changed to the second transmission rate at timing when the first transmission rate is changed (time t6). It is also similar for time t7. That is, at t7, it is detected that the second transmission rate becomes smaller than the first transmission rate, and the upper limit transmission rate is changed at time t8.

As above, when detecting that a transmission rate of a transmission signal to be transmitted next declines, a communication device of the first exemplary embodiment of the present invention reduces the upper limit transmission rate. When a rise of a transmission rate of a transmission signal to be transmitted next is detected, the upper limit transmission rate is made to be raised after transmission completion of a transmission signal which is being transmitted. Then, a transmission frame is generated such that the upper limit transmission rate is not exceeded. Therefore, an information transmission rate will be always equal to or less than a transmission rate in the transmission unit. Accordingly, it has an effect that transmission waiting and a packet loss of a transmission frame can be prevented.

(The Second Exemplary Embodiment)

Figure 4:
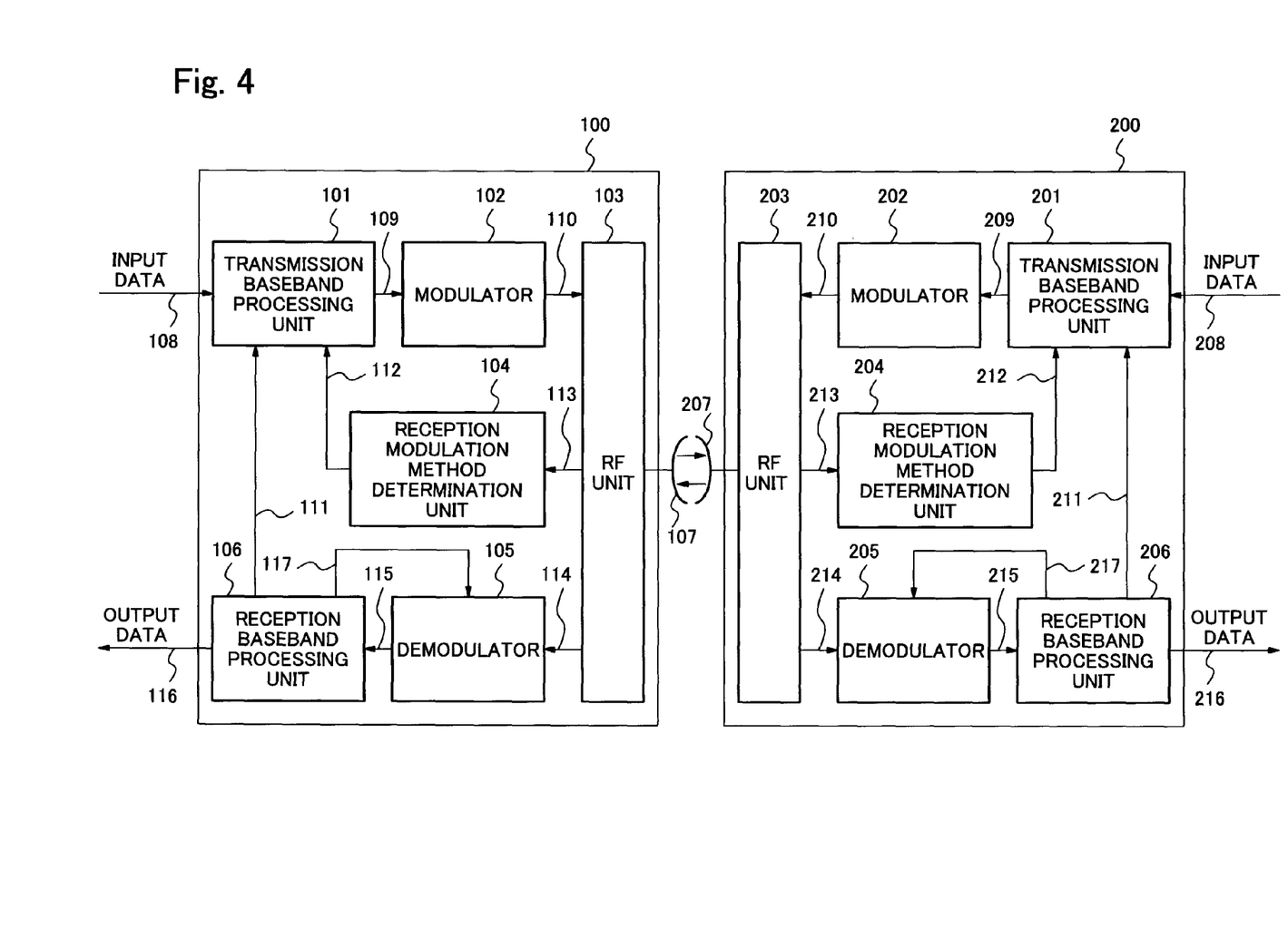
FIG. 4 is a block diagram showing a structure of a radio communication system of a second exemplary embodiment of the present invention.
Figure 5:
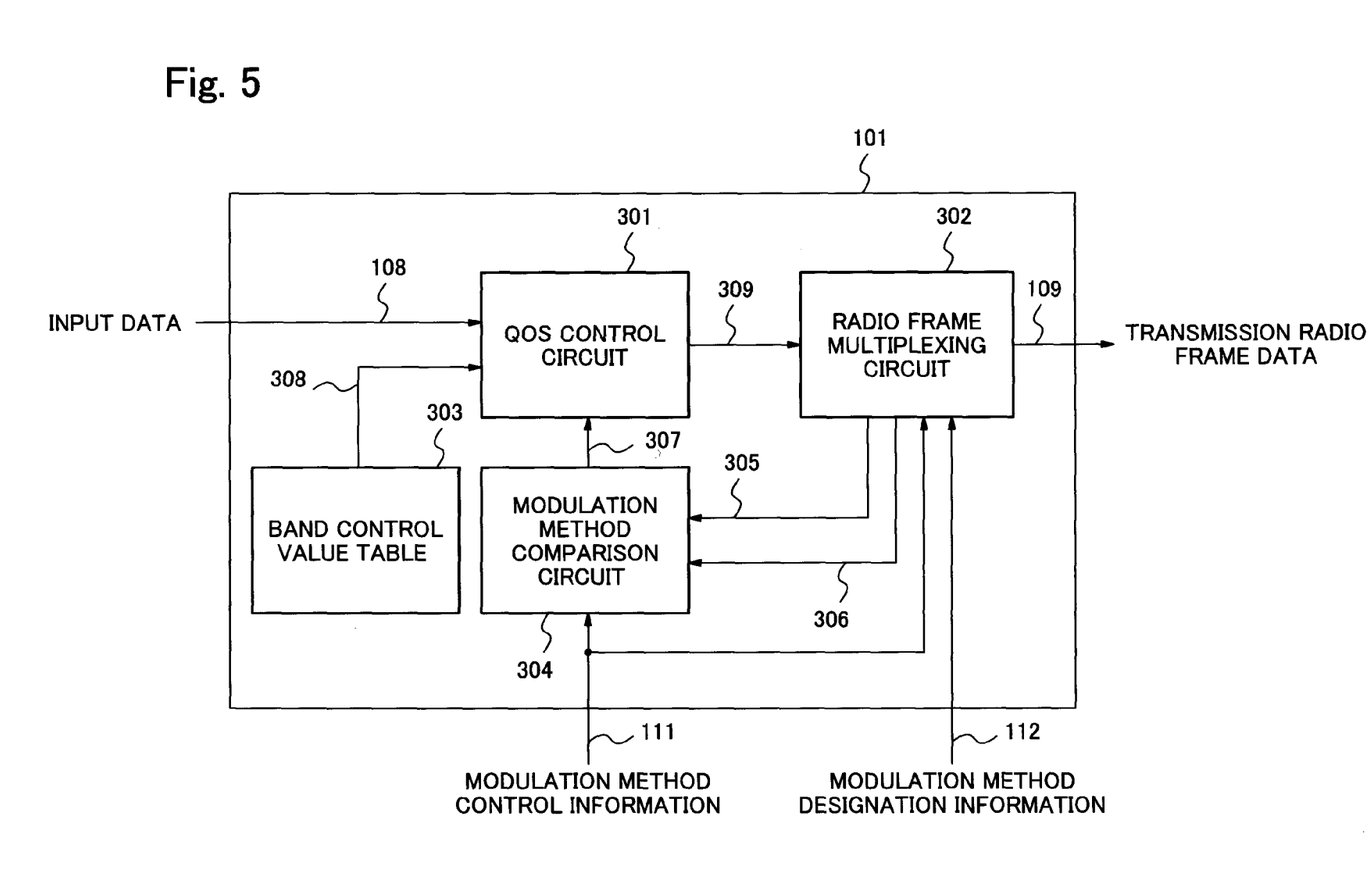
FIG. 5 is a block diagram showing a structure of a transmission baseband unit in a radio communication system of the second exemplary embodiment of the present invention.
Figure 6:
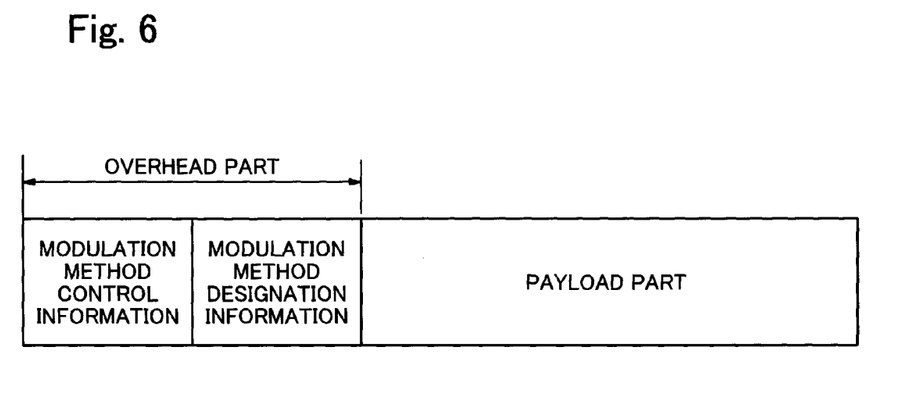
FIG. 6 is a format of a frame in a radio communication system of the second exemplary embodiment of the present invention.

Next, the second exemplary embodiment in which the present invention is applied to a specific system will be described. FIG. 4 is a block diagram showing a structure of a radio communication system of the second exemplary embodiment. FIG. 5 is a block diagram showing a structure of a transmission baseband unit in a radio communication system of the second exemplary embodiment. FIG. 6 is the format of a frame in a radio communication system of the second exemplary embodiment.

This radio communication system has a pair of opposing wireless communication devices 100 and 200. Because the wireless communication device 100 and the wireless communication device 200 have an identical structure, the structure of the wireless communication device 100 will be described below.

The wireless communication device 100 includes a transmission baseband processing unit 101, a modulator 102, a RF (Radio Frequency) unit 103, a reception modulation method determination unit 104, a demodulator 105, a reception baseband processing unit 106 and an antenna unit 107.

The transmission baseband processing unit 101 performs QoS control to an input data 108. Description of detailed processing of QoS control will be made later. The transmission baseband processing unit 101 selects a modulation method based on modulation method control information 111. Then, the transmission baseband processing unit 101 multiplexes the input data 108 and various control signals such as the modulation method control information 111 and modulation method designation information 112 into a transmission radio frame data 109 with the format shown in FIG. 6. Each frame of the transmission radio frame data 109 includes an overhead part and a payload part. The input data 108 is stored in the payload part. The modulation method control information 111 and the modulation method designation information 112 are stored in the overhead part. The transmission baseband processing unit 101 outputs the transmission radio frame data 109 to the modulator 102.

The modulator 102 modulates the transmission radio frame data 109 inputted from the transmission baseband processing unit 101 according to the modulation method control information 111 being stored in the overhead part of the last transmission radio frame data 109. Then, the modulated signal is outputted as a transmission IF (Intermediate Frequency) signal 110 to the RF unit 103.

The RF unit 103 frequency-converts the inputted transmission IF signal 110 into a predetermined radio frequency. Then, the RF unit 103 transmits the frequency-converted radio signal to the wireless communication device 200 through the antenna unit 107. Also, the RF unit 103 has a frequency conversion function for a received wireless signal. The RF unit 103 receives a wireless signal which the wireless communication device 200 has transmitted through the antenna unit 107. The RF unit 103 performs frequency conversion to the received wireless signal, and outputs it to the demodulator 105 as a reception IF signal 114. Further, the RF unit 103 outputs the level of the received signal to the reception modulation method determination unit 104 as reception level information 113.

The reception modulation method determination unit 104 selects a transmission modulation method based on the reception level information 113, and outputs the modulation method designation information 112 to the transmission baseband processing unit 101. As mentioned above, the modulation method designation information 112 is multiplexed into the transmission radio frame data 109, and is transmitted to the wireless device 200. In other words, the wireless device 100 designates to the wireless communication device 200 a modulation method which the wireless communication device 200 should apply. Thus, in an adaptive modulation method in a radio communication system of this exemplary embodiment, a transmission modulation method which should be applied is requested to a wireless communication device of an opposite station from a wireless communication device in the receiving end.

The modulation method designation information 112 will be described more in detail. The modulation method designation information 112 generated in the radio apparatus 100 is transmitted to the wireless communication device 200, and is handled as modulation method control information 211 in the wireless communication device 200. That is, a modulation method designated by the modulation method designation information 112 is multiplexed into a transmission frame data 209 as the modulation method control information 211, and transmitted to a modulator 202. The modulator 202 performs modulation according to the modulation method control information 211 multiplexed into the transmission frame data 209.

Next, a temporal difference between the time when the modulation method control information 211 is extracted from radio frame data 215 and the time when the modulation method control information 211 designates a modulation method in the modulator 202 actually will be described. The modulation method control information 211 is multiplexed into each transmission radio frame data 209. The modulation method control information 211 extracted by a reception baseband processing unit 206 from the radio frame data 215 is multiplexed into the transmission radio frame data 209 to be transmitted next. The modulation method control information 211 that has been multiplexed into the transmission radio frame data 209 being transmitted at present is information extracted from the radio frame data 215 just before the aforementioned radio frame data 215. Thus, the modulation method control information 211 has a temporal difference between the time of being extracted and the time of actually designating a modulation method. In this exemplary embodiment, by using this temporal difference, it is detected before an actual change that the modulation method is changed. Then, QoS control corresponding to the change in the modulation method is realized.

Meanwhile, according to this exemplary embodiment, in a radio communication system to which a predetermined adaptive modulation method is applied, QoS control is performed corresponding to a designated modulation method. However, in this exemplary embodiment, a specific control method of an adaptive modulation method is not limited. For example, a determination criterion for a receiving end to require a transmission modulation method to a sending end is not limited to the method using a reception level as mentioned above. Also, it may be an adaptive modulation method of a method in which a transmission side determines a transmission modulation method applied by itself according to a predetermined determination criterion specified in the transmission side.

The demodulator 105 performs demodulation processing to the reception IF signal 114. Then, the demodulator 105 outputs the reception IF signal 114 to which demodulation processing has been performed to the reception baseband processing unit 106 as reception radio frame data 115.

The reception baseband processing unit 106 extracts modulation method designation information 212 of the wireless communication device 200 from the inputted reception radio frame data 115. Into the reception radio frame data 115, the modulation method designation information 212 has been multiplexed by a reception modulation method determination unit 204 of the wireless communication device 200. The reception baseband processing unit 106 outputs the modulation method control information 111 that should be applied to the wireless communication device 100 to the transmission baseband processing unit 101. In addition, a reception baseband processing unit 105 outputs a payload data multiplexed into the reception radio frame data 115 as output data 116.

As mentioned above, the antenna unit 107 transmits a radio signal from the RF unit 103 to the wireless communication device 200, and receives a radio signal from the wireless communication device 200 and outputs it to the RF unit 103.

Mechanism of switching of a modulation method starting from the transmission baseband processing unit 101 of the wireless communication device 100 and ending with a reception baseband processing unit 206 of the wireless communication device 200 will be described using the frame format shown in FIG. 6. A transmission radio frame data 110 includes frames shown in FIG. 6 in sequence timewise. Switching of a modulation method is performed in units of a radio frame. Accordingly, a modulation method of a certain radio frame is indicated by modulation method control information included in the overhead part of the last frame. This is because it is necessary for the demodulator of an opposite station to know timing of modulation method switching in advance. In an opposite station, which modulation method is applied to a certain reception radio frame can be known for the first time when a reception IF signal is demodulated in a demodulator. However, in order to obtain correct reception radio frame data, it is necessary to know its modulation method in advance to demodulate a reception IF signal. Therefore, modulation method control information should indicate a modulation method of the next radio frame, not a modulation method of a radio frame including itself.

With reference to FIG. 4, a signal flow until the input data 108 inputted to the wireless communication device 100 is outputted from the wireless communication device 200 that is an opposite station as an output data 216 will be described.

The input data 108 inputted to the wireless communication device 100 is multiplexed by the transmission baseband processing unit 101 into the payload part in the format shown in FIG. 6. Then, the multiplexed data is outputted as the transmission radio frame data 109. The modulator 102 modulates the transmission radio frame data 109 according to modulation method control information of the overhead part in the transmission radio frame data 109. The modulated transmission IF signal 110 is frequency-converted by the RF unit 103 and transmitted toward the wireless communication device 200 from the antenna unit 107. The transmitted wireless signal is received by an antenna unit 207 of the wireless communication device 200, and is outputted from an RF unit 203 as a reception IF signal 214. A demodulator 205 demodulates the reception IF signal 214 according to modulation method control information 217 of the overhead part of the last reception radio frame data 215, and outputs it as reception radio frame data 215. The modulation method control information 217 is information extracted from the overhead part in the last reception radio frame data 215 by the reception baseband processing unit 206, and is information indicating a modulation method being applied to the reception IF signal 214 that is being received at present. The reception baseband processing unit 206 extracts data from the payload part in the radio frame format of the reception radio frame data 215 and outputs the output data 216.

Because a flow of a signal from the wireless communication device 200 to the wireless communication device 100 is also similar to the above, description will be omitted.

With reference to FIG. 5, the configuration of the transmission baseband processing unit 101 will be described. The baseband processing unit 101 includes a QoS control circuit 301, a radio frame multiplexing circuit 302, a band control value table 303 and a modulation method comparison circuit 304.

The radio frame multiplexing circuit 302 outputs a radio frame reference pulse signal 306 and modulation method information 305 which is an information signal of a modulation method selected at present to the modulation method comparison circuit 304. The radio frame reference pulse signal 306 is a signal which indicates timing of the boundary between frames. Alternately, the radio frame reference pulse signal 306 may be a signal which indicates completion of transmission of a frame.

In the modulation method comparison circuit 304, each time the radio frame reference pulse signal 306 is inputted, the sizes of multi-value numbers of a modulation method indicated by the modulation method information 305 and of a modulation method indicated by the modulation method control information 111 is compared. The modulation method comparison circuit 304 outputs a band limitation control signal 307 to the QoS control circuit based on the comparison result.

The QoS control circuit 301 acquires a band control value 308 from the band control value table 303 according to the band limitation control signal 307. The QoS control circuit 301 performs QoS control to the input data 108 using the acquired band control value 308, and outputs an input data 309 after the QoS control. As QoS control here, processing called "Shaping" that has been described above should just be performed. Meanwhile, "band control value" is a numerical value which indicates the upper limit value of an available transmission rate in a wireless section. Accordingly, each packet of which data to be inputted is composed is selected based on the priority of the packet concerned in a manner only packets in a range where the sum of bands required for transmission is equal to or less than the band control value are selected. Among packets with low priority, packets by which the sum of bands required for transmission exceeds a band control value are canceled.

The radio frame multiplexing circuit 302 multiplexes the input data 309 after QoS control processing to which QoS control has been performed into the payload part in a frame. Further, the radio frame multiplexing circuit 302 multiplexes the modulation method control information 111 and the modulation method designation information 112 that is inputted into the overhead part in the frame. After multiplexing predetermined data into the overhead part and the payload part in the radio frame, the radio frame multiplexing circuit 302 outputs the frame as the transmission radio frame data 109.

Next, operations of the modulation method comparison circuit 304 that performs a comparative determination process for QoS control will be described more in detail.

Each time the radio frame reference pulse signal 306 is inputted, the modulation method comparison circuit 304 compares the sizes of the multi-value numbers of modulation methods designated by the modulation method information 305 and by the modulation method control information 111.

A modulation method designated by the modulation method information 305 is a modulation method being applied in the modulator 102 at present (henceforth, referred to as "the present modulation method"). A modulation method designated by the modulation method control information 111 is a modulation method to be applied in the modulator 102 when the next frame is transmitted (henceforth, referred to as "the next modulation method"). The next modulation method is a modulation method designated by the wireless communication device 200 using the modulation method designation information 212.

When a modulation method is changed, an information transmission rate of a wireless section changes. Therefore, QoS control needs to be performed according to a modulation method to be applied. Generally, when a symbol rate does not change, a change in an information transmission rate of a wireless section can be judged by the size of a multi-value number of a modulation method. Accordingly, in this exemplary embodiment, QoS control is performed by focusing attention on a change between the multi-value numbers of modulation methods before and after the change in a modulation method.

The modulation method comparison circuit 304 performs the following operations according to a magnitude correlation between the multi-value number of the present modulation method and the multi-value number of the next modulation method.

i) In a case when a multi-value number of the present modulation method>a multi-value number of the next modulation method In this case, it is meant that the information transmission rate of a wireless section declines starting from the time of transmission of the next frame. Therefore, band limitation needs to be performed immediately by QoS control. Accordingly, the modulation method comparison circuit 304 outputs the band limitation control signal 307 to change a band limitation value used for QoS control in the QoS control circuit

301 to a value corresponding to the next modulation method from a value corresponding to the present modulation method.

The above-mentioned change of the band limitation value used for QoS control is the feature of this exemplary embodiment. Therefore, the purpose of this will be described in detail below. When a multi-value number B of the next modulation method is smaller than a multi-value number A of the present modulation method, a band of a wireless section declines for the next frame. Accordingly, by the time when the band of the wireless section declines at the latest, band limitation required for transmission of information needs to be completed.

On this occasion, it is also conceivable that the band limitation value for QoS control of the QoS control circuit 301 is changed simultaneously with input of the next radio frame reference pulse signal 306. In other words, it is such that the band limitation value of QoS control is changed simultaneously with a change of a modulation method without changing prior to the change of the modulation method. In this case, a band of a wireless section becomes smaller compared with the data capacity in a transmission buffer carrying out QoS control. That is, as a result of performing band limitation simultaneously with a change of a modulation method, data which has been stored in the transmission buffer corresponding to a band before the change will be transmitted at a low transmission rate because a wireless transmission capacity becomes small. Accordingly, about a packet with low priority, data transfer efficiency declines because a transmission waiting time occurs, and, also regarding a packet with the highest priority, a packet loss may occur because of being not transmitted within a desired time.

As above, when a band limitation value which is used in order to perform band limitation is changed simultaneously with change of a modulation method, a problem such as occurrence of a waiting time and a packet loss may occur. Accordingly, in this exemplary embodiment, when a band of a wireless section becomes small along with a change of a modulation method, a band limitation value which is used in order to perform band limitation is changed prior to the change of the modulation method.

ii) In a case when a multi-value number of the present modulation method=a multi-value number of the next modulation method In this case, it is meant that a band of a wireless section does not change. Therefore, communication can be continued while keeping the present band. When band limitation by QoS control is being performed, communication may be continued with the band at that time just as it is. Accordingly, the modulation method comparison circuit 304 does not perform control in particular.

iii) In a case when a multi-value number of the present modulation method<a multi-value number of the next modulation method In this case, it is meant that a band of a wireless section is increased. In this case, it is desired to change a band limitation value according to the next modulation method as early as possible after a band of a wireless section is increased. Accordingly, the modulation method comparison circuit 304 outputs the band limitation control signal 307 at the time of input of the next radio frame reference pulse signal 306, and changes the band limitation value of the QoS control circuit 301 to a value corresponding to the next modulation method from a value corresponding to the present modulation method.

Meanwhile, when a multi-value number is constant, the information transmission rate of a wireless section can be determined using the size of a symbol rate. Of course, the information transmission rate of a wireless section can also be determined using the transmission rate of an applied modulation method. Accordingly, QoS control may be performed by focusing attention on a change in a symbol rate and a transmission rate.

The structures of the above-mentioned wireless communication device 100 and each component including the transmission baseband processing unit 101 having a QoS control function are also common to the wireless communication device 200. In FIG. 4, the most significant digit of a code that has been attached to each component of the wireless communication device 100 and to a signal used inside the wireless communication device 100 is standardized to "1". Regarding the wireless communication device 200, the most significant digit of a code which has been attached to each component of the wireless communication device 100 and a signal being used is changed to "2", and the same numbers are used for all other digits. For example, an antenna of the wireless communication device 200 corresponding to the antenna 107 of the wireless communication device 100 is being indicated as an antenna 207.

Figure 7:
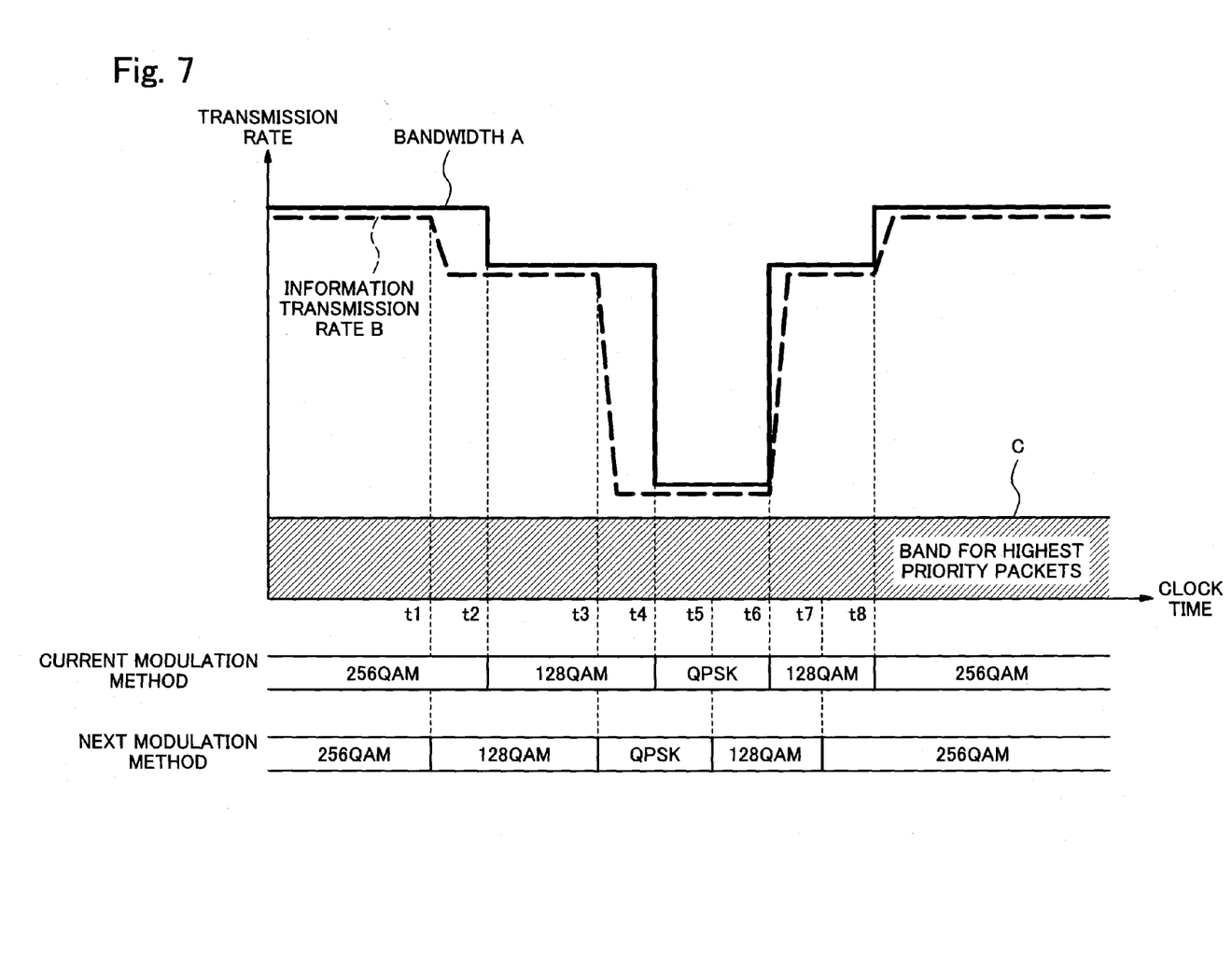
FIG. 7 is a graph showing an operation of a communication device of the second exemplary embodiment of the present invention.

A specific example of operations of this exemplary embodiment will be described using the graph of FIG. 7. FIG. 7 is a graph showing an example of operations of this exemplary embodiment, and the vertical axis is a transmission rate and the horizontal axis is clock time. About each line of the graph, solid line A indicates a wireless transmission rate (a bandwidth of a wireless section), dashed line B indicates a transmission rate of packet data as a result of QoS control having been performed, and slant line part C indicates a band of the highest priority packet. Also, in the lower part of the graph, transition of the present modulation method and the next modulation method is indicated. As a modulation method, any one of 256-value QAM (256-Quadrature Amplitude Modification: 256QAM), 128-value QAM (128QAM) or 4-value PSK (Quadrature Phase Shift Keying: QPSK) is applied. It is supposed that a transmission rate of a wireless section is the highest in 256QAM, followed by 128QAM and PSK in this order. It is also supposed that a band required for transmission of highest priority packets does not exceed a wireless transmission rate even when QPSK that has the smallest multi-value number of modulation, that is, the smallest transmission rate is applied.

By comparing the modulation method information 305 and the modulation method control information 111, the modulation method comparison circuit 304 detects that a modulation method changes at time t1 prior to actual change.

At that time, when detecting that a transmission rate of the next modulation method becomes smaller than the transmission rate of the present transmission method, that is, that a multi-value number of a modulation method decreases, the band limitation value is changed immediately. In other words, a band limitation value (the upper limit transmission rate) which becomes the standard for performing QoS control is changed to the next transmission rate, and the transmission rate of packet data is suppressed before change of the present modulation method. It is also similar for time t3. That is, at t3, it is detected that the transmission rate of the next modulation method becomes smaller than the transmission rate of the present transmission method, and a band limitation value is changed at time t4.

At time t5, it is detected that the next transmission rate becomes larger than the present transmission rate, that is, that a multi-value number of a modulation method increases. At that time, the band limitation value is changed at timing when the present modulation method is changed (time t6). That is, a band limitation value which becomes the standard for performing QoS control is changed to the next transmission rate, and the transmission rate of packet data is raised. It is also similar for time t7. That is, it is detected that the transmission rate of the next modulation method becomes smaller than the transmission rate of the present transmission method at t7, the band limitation value is changed at time t8.

Meanwhile, as shown in FIG. 7, when a band limitation value is changed at t1, t3, t6 or t8, a packet data transmission rate changes gradually. This is because, when a band limitation value is changed, packets to which QoS control has been performed using the band limitation value before the change and packets to which QoS control has been performed using the band limitation value after the change are intermingled. Because, in the graph of FIG. 3 showing operations of the first exemplary embodiment, the dashed line indicates an upper limit transmission rate (band limitation value), its value changes in a step-like shape simultaneously with a change of an upper limit transmission rate.

Meanwhile, by the modulation method comparison circuit 304 holding the modulation method control information 111, a change in the modulation method control information 111 can be detected. Accordingly, the modulation method comparison circuit 304 can detect that the transmission rate of the next modulation method becomes smaller than the transmission rate of the present transmission method without referring to the modulation method information 305. Therefore, when the transmission rate of the next modulation method becomes smaller than the transmission rate of the present transmission method, it should just change a band limitation value simultaneously with detection of a change in the modulation method control information 111. When the transmission rate of the next modulation method becomes larger than the transmission rate of the present transmission method, it is necessary to know timing when a band limitation value which becomes the standard for performing QoS control is changed. At that time, the radio frame reference pulse signal 306 should just be received from the radio frame multiplexing circuit 302.

As above, in a radio communication system of this exemplary embodiment, a transmission rate of packet data is reduced to the wireless transmission rate after a change or less before a wireless transmission rate declines. Accordingly, it has an effect that variation of a delay time of packet data due to a data processing time for such as flow control is not caused. Also, after a wireless transmission rate is raised, the transmission rate of packet data is made to rise to the wireless transmission rate after a change. Accordingly, it has an effect that a wireless transmission rate can be utilized effectively corresponding to improvement of a radio transmission channel.

Meanwhile, although, in the second exemplary embodiment, wireless communication in which transmission and reception is performed using the antenna units 107 and 207 is indicated as an example, the present invention is applicable for communication by not only a wireless connection but also a wired connection.

The above mentioned exemplary embodiments can be combined with other exemplary embodiments respectively.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-282562, filed on Dec. 14, 2009, the disclosure of which is incorporated herein in its entirety by reference.

Industrial Applicability

The present invention relates to a communication device and a communication control method, and, more particularly, to a communication device and a communication control method which perform service quality control based on a change in a transmission rate, and thus it has industrial applicability.

REFERENCE SIGNS LIST

10 Wireless communication device
20 Input signal
21 Received data
22 Transmission control information
30 Transmission signal
31 Transmitted data
32 Transmission frame
33 Transmission timing signal
34 Transmission rate information
100, 200 Wireless communication device
101, 201 Transmission baseband processing unit
107, 207 Antenna unit
109, 209 Transmission radio frame data
110, 210 Transmission IF signal
111, 211 Modulation method control information
112, 212 Modulation method designation information
113, 213 Reception level information
114, 241 Reception IF signal
115, 215 Reception radio frame data
305 Modulation method information
306 Radio frame reference pulse signal
307 Band limitation control signal
308 Band control value
309 Input data

The invention claimed is:

1. A communication device, comprising:
a reception unit for receiving an input signal, and outputting received data;
a transmission unit that accepts a transmission frame, transmits a transmission signal at a first transmission rate set based on transmission control information, and outputs a transmission timing signal indicating completion timing of transmission of said transmission signal;
an information extracting unit that extracts said transmission control information from said received data, and designates a second transmission rate when transmitting next said transmission frame to said transmission unit; and
a service quality control unit that changes, upon detecting a second transmission rate being smaller than said first transmission rate, an upper limit transmission rate to said second transmission rate or less, changes, upon detecting a second transmission rate being larger than said first transmission rate, said upper limit transmission rate to said second transmission rate or less after said completion timing, and generates said transmission frame from transmitted data based on said upper limit transmission rate,
wherein said transmitted data includes a plurality of frames, to each of which predetermined priority is set; and
wherein said service quality control unit performs flow control between itself and sources of certain frames among said plurality of frames based on said limit transmission rate and said priority, and selects frames from sources except for said sources of said certain frames as said transmission frame.

2. The communication device according to claim 1, wherein said service quality control unit generates said transmission frame from said transmitted data such that a transmission rate required for transmission becomes equal to or less than said upper limit transmission rate.

3. The communication device according to claim 1, wherein said service quality control unit selects said transmission frame based on said upper limit transmission rate and said priority.

4. The communication device according to claim 3, wherein an information transmission rate being a transmission rate required for transmission is set to each of said plurality of frames; and
wherein said service quality control unit selects said transmission frame based on said priority such that an amount of said information transmission rate of each of said selected transmission frames is equal to or less than said upper limit transmission rate.

5. The communication device according to claim 1, wherein said transmission control information includes modulation method designation information for designating a modulation method, and
wherein said transmission unit modulates said transmission frame based on said modulation method.

6. The communication device according to claim 5, wherein said service quality control unit determines a change in said transmission rate based on a multi-value number, which is a number of stages of modulation in said modulation method.

7. The communication device according to claim 5, wherein said service quality control unit determines a change in said transmission rate based on a modulation rate in said modulation method.

8. A communication control method, comprising the steps of:
receiving an input signal, and outputting received data;
accepting a transmission frame, transmitting a transmission signal at a first transmission rate set based on transmission control information, and outputting a transmission timing signal indicating completion timing of transmission of said transmission signal;
extracting said transmission control information from said received data, and designating a second transmission rate when transmitting next said transmission frame; and
changing, upon detecting a second transmission rate being smaller than said first transmission rate, an upper limit transmission rate to said second transmission rate or less, changing, upon detecting a second transmission rate being larger than said first transmission rate, said upper limit transmission rate to said second transmission rate or less after said completion timing, and generating said transmission frame from transmitted data based on said upper limit transmission rate,
wherein said transmitted data includes a plurality of frames, to each of which predetermined priority is set; and
wherein flow control is performed between itself and sources of certain frames among said plurality of frames based on said limit transmission rate and said priority, and said frames from sources except for said sources of said certain frames are selected as said transmission frame.

9. The communication control method according to claim 8, wherein said transmission frame is generated from said transmitted data such that a transmission rate required for transmission becomes equal to or less than said upper limit transmission rate.

10. The communication control method according to claim 8, wherein said transmission frame is selected based on said upper limit transmission rate and said priority.

11. The communication control method according to claim 10, wherein an information transmission rate being a transmission rate required for transmission is set to each of said plurality of frames; and
wherein said transmission frame is selected based on said priority such that an amount of said information transmission rate of each of said selected transmission frames is equal to or less than said upper limit transmission rate.

12. The communication control method according to claim 8, wherein said transmission control information includes modulation method designation information for designating a modulation method, and
wherein said transmission frame is modulated based on said modulation method.

13. The communication control method according to claim 12, wherein a change in said transmission rate is determined based on a multi-value number, which is a number of stages of modulation in said modulation method.

14. The communication control method according to claim 12, wherein a change in said transmission rate is determined based on a modulation rate in said modulation method.

* * * * *